(12) United States Patent
Rietman et al.

(10) Patent No.: US 11,290,272 B2
(45) Date of Patent: Mar. 29, 2022

(54) ELLIPTIC CURVE POINT MULTIPLICATION DEVICE AND METHOD IN A WHITE-BOX CONTEXT

(71) Applicant: KONINKLIJKE PHILIPS N.V., Eindhoven (NL)

(72) Inventors: Ronald Rietman, Eindhoven (NL); Sebastiaan Jacobus De Hoogh, Oosterhout (NL)

(73) Assignee: Koninklijke Philips N.V., Eindhoven (NL)

( * ) Notice: Subject to any disclaimer, the term of this patent is extended or adjusted under 35 U.S.C. 154(b) by 273 days.

(21) Appl. No.: 16/493,116

(22) PCT Filed: Mar. 15, 2018

(86) PCT No.: PCT/EP2018/056492
§ 371 (c)(1),
(2) Date: Sep. 11, 2019

(87) PCT Pub. No.: WO2018/167198
PCT Pub. Date: Sep. 20, 2018

(65) Prior Publication Data
US 2020/0119918 A1    Apr. 16, 2020

(30) Foreign Application Priority Data
Mar. 17, 2017    (EP) .................................... 17161578

(51) Int. Cl.
*H04L 9/30*    (2006.01)
*H04L 9/00*    (2006.01)
*H04L 9/32*    (2006.01)

(52) U.S. Cl.
CPC ............ *H04L 9/3066* (2013.01); *H04L 9/002* (2013.01); *H04L 9/3013* (2013.01); *H04L 9/3252* (2013.01); *H04L 2209/08* (2013.01); *H04L 2209/16* (2013.01)

(58) Field of Classification Search
CPC ......... H04L 9/002; H04L 9/3006–3013; H04L 9/3066; H04L 9/3247; H04L 9/3252; H04L 2209/08; H04L 2209/16
See application file for complete search history.

(56) References Cited

U.S. PATENT DOCUMENTS

| | | | | |
|---|---|---|---|---|
| 9,455,832 B2 * | 9/2016 | Brown | ................. | H04L 9/3252 |
| 9,584,320 B1 * | 2/2017 | Parkinson | ............. | H04L 9/0841 |
| 2003/0194086 A1 | 10/2003 | Lambert | | |
| 2009/0199010 A1 * | 8/2009 | Hakuta | ................. | H04L 9/3236 |
| | | | | 713/176 |
| 2011/0055585 A1 * | 3/2011 | Lee | ........................ | H04L 9/0844 |
| | | | | 713/183 |
| 2011/0154044 A1 * | 6/2011 | Spalka | ................ | H04L 63/0442 |
| | | | | 713/176 |
| 2011/0208971 A1 | 8/2011 | Bhattacharya et al. | | |
| 2012/0089844 A1 | 4/2012 | Vanstone et al. | | |
| 2013/0024699 A1 | 1/2013 | Muir et al. | | |
| 2013/0117569 A1 | 5/2013 | Sovio et al. | | |
| 2013/0198516 A1 * | 8/2013 | Fenton | .................... | H04L 63/08 |
| | | | | 713/168 |
| 2015/0333906 A1 | 11/2015 | Rahman et al. | | |
| 2017/0163421 A1 * | 6/2017 | Chase | ....................... | G09C 1/00 |
| 2018/0115419 A1 * | 4/2018 | Bos | ........................ | H04L 9/3066 |

FOREIGN PATENT DOCUMENTS

| | | |
|---|---|---|
| EP | 3038287 A1 | 6/2016 |
| EP | 3125145 A1 | 1/2017 |
| WO | 2013116916 A1 | 8/2013 |
| WO | 2014095772 A1 | 6/2014 |
| WO | 2015091172 A1 | 6/2015 |
| WO | 2016173882 A1 | 11/2016 |

OTHER PUBLICATIONS

Chow et al: "A White-Box DES Implementation for DRM Applications"; LNCS 2696. pp. 1-15. 2003.
IBM Corporation: "Arxan Cryptographic Key Protection Add-On for IBM Solutions"; 2015, 3 Page Document.
Montgomery: "Modular Multiplication Without Trial Division"; Mathematics of Computation, vol. 44, No. 170, Apr. 1985, pp. 519-521.
PCT/EP2018/056492: ISR and Written Opinion, dated May 24, 2018, 13 Page Document.

* cited by examiner

*Primary Examiner* — Kevin Bechtel
*Assistant Examiner* — D'Arcy Winston Straub

(57) ABSTRACT

An electronic point multiplication device (100) is provided for computing a point multiplication (kG) on an elliptic curve between a multiplier (k) and a base point (G) on the elliptic curve (E) for use in a cryptographic protocol. The device being arranged to compute from a first set of multiple joint encodings ($A_i$) a blinded base multiplier (A, 131), and a second set of multiple joint encodings ($B_i$) multiple blinded auxiliary multipliers ($\eta_i$, 136). The device performs obtains the point multiplication (141) (kG) of the multiplier (k) and the base point (G) by computing the point addition of the point multiplication of the blinded base multiplier and the base point on the elliptic curve, and the multiple point multiplications of a blinded auxiliary multiplier and an auxiliary point. The blinded base multiplier and auxiliary multipliers may be represented in a plain format during the performing of the elliptic curve arithmetic.

16 Claims, 6 Drawing Sheets

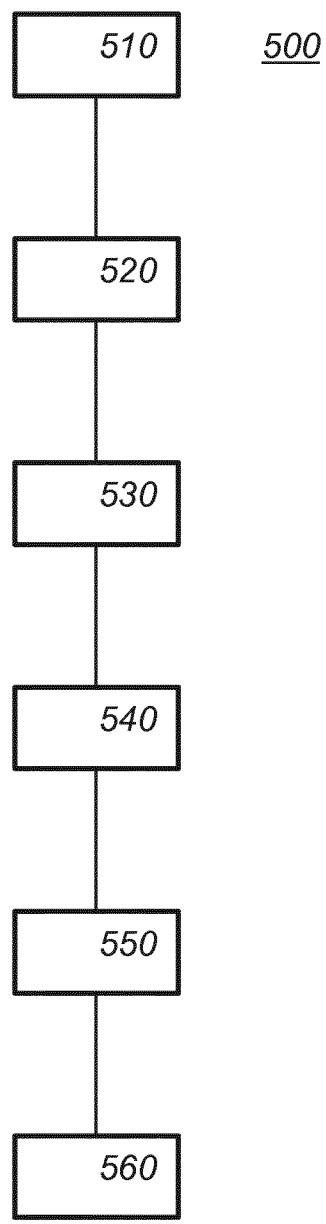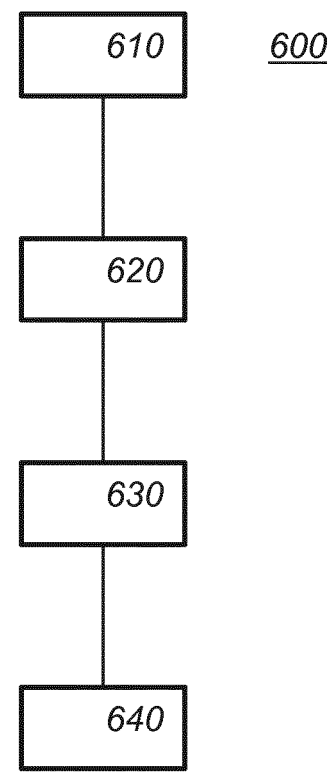
Fig. 5
Fig. 6

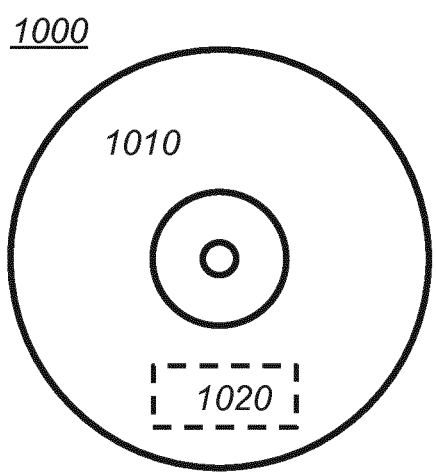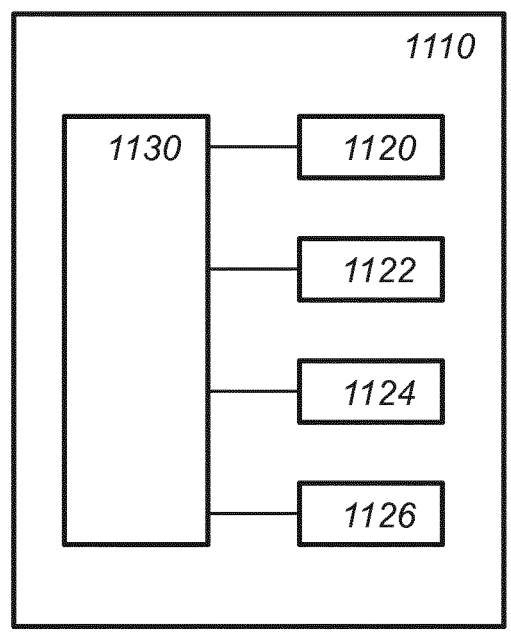
*Fig. 7a*  *Fig. 7b*

ELLIPTIC CURVE POINT MULTIPLICATION DEVICE AND METHOD IN A WHITE-BOX CONTEXT

CROSS-REFERENCE TO PRIOR APPLICATIONS

This application is the U.S. National Phase application under 35 U.S.C. § 371 of International Application No. PCT/EP2018/056492, filed on Mar. 15, 2018, which claims the benefit of European Patent Application No. 17161578.4, filed on Mar. 17, 2017. These applications are hereby incorporated by reference herein.

FIELD OF THE INVENTION

The invention relates to a point multiplication device, a point multiplication method and a computer readable medium.

BACKGROUND OF THE INVENTION

In many applications, software is used to sign messages, with the aim of proving authenticity of the message and the signer. The signer signs a message using a private key and the message digest. Anybody who receives the message and the signature can verify the signature using the sender's public key. A secure signing system should have the following properties
1. It should be hard to find the private key, given the public key and other public system parameters.
2. The digest should be a cryptographic hash for which it is hard to find collisions and pre-images. This prevents an attacker to impersonate the sender. For example, by re-using signatures of old messages from the sender on his own messages.
3. The private key should be kept private and be known only to the sender.

The first two requirements are the requirements for black box security. It is believed that a signature scheme such as the Elliptic Curve Digital Signature Algorithm (ECDSA) satisfies these requirements.

The third requirement is of a different nature, as there are many ways in which a private key could leak. The following is a non-exhaustive list of potential leaks.

The system may require the signer to enter his private key for each new signature. If a key logger is installed on the system, an attacker can read the private key while it is being typed by the signer.

The private key may be stored on the filesystem. Even if the file access permissions are set correctly, a malicious root user on the system could read the private key.

The private key may be stored on the filesystem in an encrypted file, where decrypting the file requires typing a passphrase. An attacker who manages to install a key logger and has access to the file can obtain the private key.

The private key may be stored in encrypted form inside the signing program, and be decrypted only during execution. The decryption key is stored inside the program as well, and decryption may be activated only when the user enters a correct passphrase. Now an attacker who, by exploiting a bug in the operating system, is able to read the memory of other users' processes, may be able to read the decrypted private key from memory.

There is a desire to protect implementations of cryptographic protocols, such as the ECDSA protocol, against leaking of the private key.

SUMMARY OF THE INVENTION

The inventors realized that many vulnerabilities in the ECDSA protocol are caused by the point multiplication operation on the elliptic curve that ECDSA comprises. Elliptic curve arithmetic is moreover an element of many other cryptographic protocols, making it even more desirable to have implementations of point multiplication with increased resistance against attack in the white-box model.

An electronic point multiplication device is provided for computing a point multiplication on an elliptic curve between a multiplier and a base point on the elliptic curve for use in a cryptographic protocol. The device comprises
  a storage storing the base point and multiple pre-computed auxiliary points on the elliptic curve,
  an input interface arranged to receive a base hash of an input message,
  a processor circuit arranged to
    derive the multiplier and multiple derived hashes from the base hash in the form of a first and second set of multiple joint encodings, the first set comprising the multiple derived hashes each of which is jointly encoded with the multiplier, the second set also comprising the multiple derived hashes each one of the derived hashes in the second set being jointly encoded with at least one other of the multiple derived hashes,
    compute from the first set of multiple joint encodings a blinded base multiplier,
    compute from the second set of multiple joint encodings multiple blinded auxiliary multipliers, the multiple blinded auxiliary multipliers corresponding to the multiple auxiliary points,
    perform blinded elliptic curve arithmetic to obtain the point multiplication of the multiplier and the base point by computing the point addition of:
      the point multiplication of the blinded base multiplier and the base point on the elliptic curve, and
      the multiple point multiplications of a blinded auxiliary multiplier and an auxiliary point.

Interestingly, the required point multiplication kG is translated into multiple point multiplication with the base point G but also a number of additional auxiliary points. Attacking the system requires of the attacker that he either finds the multiplier k form the multiplication kG, or determines the relationship between the auxiliary points and the base point. Both of these would require solving a discrete logarithm problem on the elliptic curve, which is assumed to be impractically hard, e.g., requiring more resources than the assets protected by the cryptographic protocol are worth. Alternatively, an attacker may try to attack the system using fault attacks, however these are countered using the system of encoding; details are further explicated below.

Interestingly, the blinded base multiplier and the multiple blinded auxiliary multipliers may be represented in a plain format during the performing of the blinded elliptic curve arithmetic. This means that for the elliptic curve arithmetic no protection in the form of a white-box implementation is needed. The inventors have found that white-box protecting elliptic curve arithmetic is hard, as the elliptic curve algorithm is notoriously sensitive to side channel attacks. By spreading an elliptic curve multiplication over multiple auxiliary points, this weakness in elliptic curve cryptography is addressed; leading to implementations with increased resistance in the white-box model.

Interestingly, embodiments combine white-box technology, e.g., operating on encoded data through look-up tables, with blinding, e.g., replacing a first plain computation with another second plain computation so that the desired first computation result may be derived from the second computation result.

The point multiplication device is an electronic device, and may be, e.g., a mobile electronic device such as a mobile phone. The point multiplication device may also be, e.g., set-top box, smart-card, computer, etc.

The point multiplication device and method described herein may be applied in a wide range of practical applications. Such practical applications include cryptographic protocols that include elliptic curve computations, in particular the ECDSA protocol. ECDSA may be used to sign data, e.g., in application that require authentication, integrity of data, etc. Such applications may include messaging applications, mail programs, financial applications, and the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a point multiplication device, FIG. 2 schematically shows an example of an embodiment of deriving a first set of multiple joint encodings, FIG. 3 schematically shows an example of an embodiment of deriving a second set of multiple joint encodings, FIG. 4 schematically shows an example of an embodiment of an ECDSA device, FIG. 5 schematically shows an example of an embodiment of a point multiplication method, FIG. 6 schematically shows an example of an embodiment of a ECDSA signature method, FIG. 7a schematically shows a computer readable medium having a writable part comprising a computer program according to an embodiment, FIG. 7b schematically shows a representation of a processor system according to an embodiment.

LIST OF REFERENCE NUMERALS IN FIGS. 1 AND 4

Figure 1:
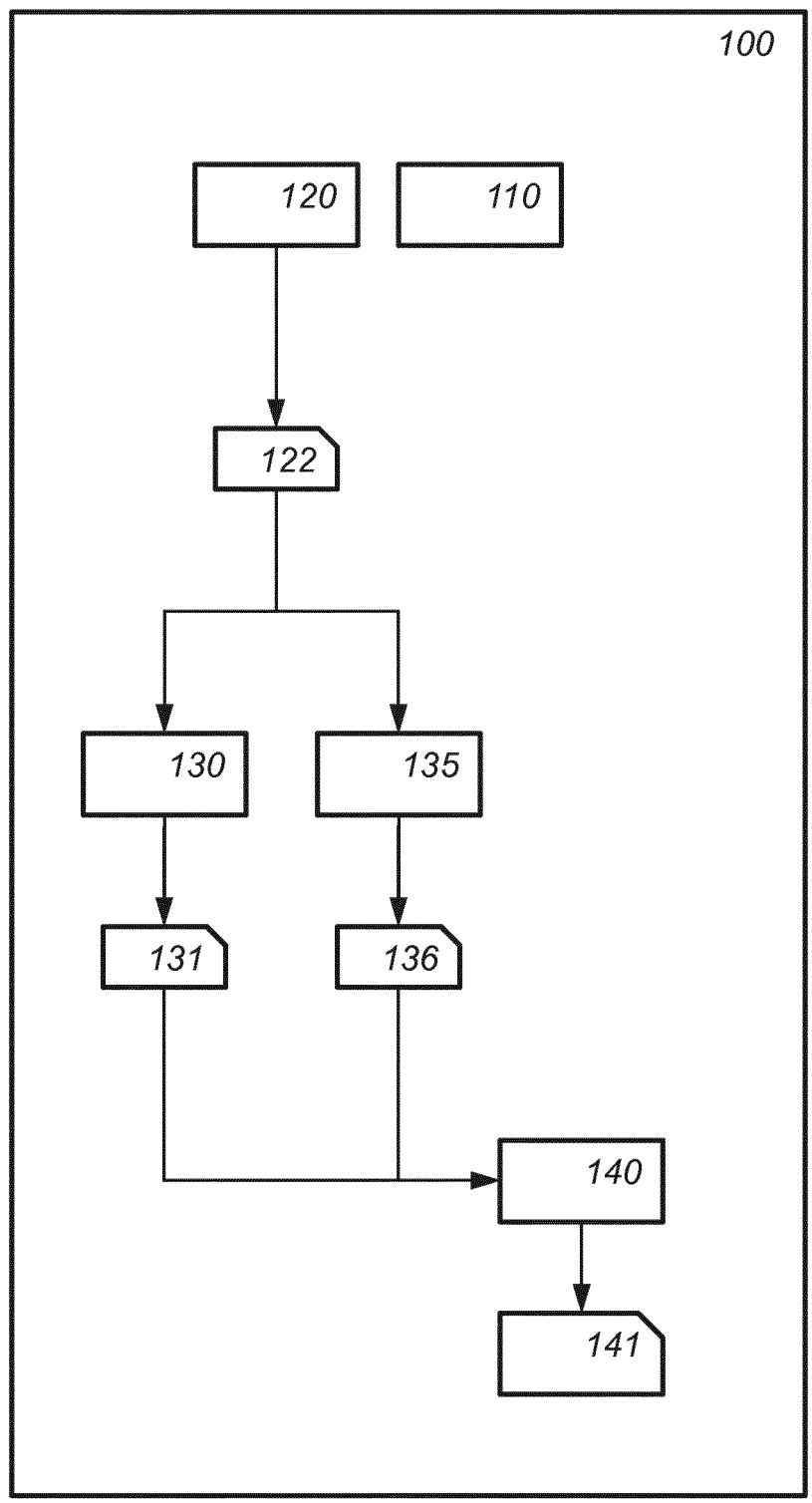

100 a point multiplication device
110 a storage
120 an input interface
122 a base hash
130 a first encoded computation network
131 a blinded base multiplier
135 a second encoded computation network
136 multiple blinded auxiliary multipliers
140 an elliptic curve arithmetic unit
141 a point multiplication result
150 a third encoded computation network
151 a blinded multiplier
155 a fourth encoded computation network
156 a blinded base hash
157 a de-blinding value
160 a sixth encoded computation network
161 a second component of an ECDSA signature
400 an ECDSA device

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

The inventors found that elliptic curve computations are difficult to protect as the computation is remarkably vulnerable to side channel attacks. They found that side channel attacks, even if they were originally targeted for a grey-box model, may often also be successfully applied in the white-box model. Even if a direct white-box implementation of elliptic curve computations were achieved, that operates on encoded data, then there is still a good chance that existing or future side channel attacks may break it. In a grey box model, the attacker has access to some partial side-channel information; e.g., the power use of the device. In the white-box model, the attacker has full access to the internal state.

Elliptic curve computations are used in various cryptographic algorithms, e.g., where there may be a desire to hide a performed ECC point multiplication from a user of the system, e.g., an attacker in the white-box model. Examples of cryptographic algorithms employing elliptic curve computations include: elliptic curve Diffie-Hellman (ECDH) key agreement, the Elliptic Curve Integrated Encryption Scheme (ECIES), the Elliptic Curve Digital Signature Algorithm (ECDSA), the Edwards-curve Digital Signature Algorithm (EdDSA), the ECMQV key agreement scheme, and the ECQV implicit certificate scheme.

The embodiments below focus on the Elliptic Curve Digital Signature Algorithm (ECDSA). ECDSA is an important signature algorithm, for which it is desirable to obtain an implementation with increased resistance in the white-box model. Preferably, without actually white-box protecting the elliptic curve arithmetic of the elliptic curve signature algorithm. However, the point multiplication technique disclosed below may also be employed in other ECC algorithms.

The inventors found a way to perform ECC arithmetic on encoded data by dividing an elliptic curve computation for a single curve point over multiple curve points. The latter computations may even be performed in plain, although the lead-up to the multiple point arithmetic may be done in a white-box format, e.g., operating on encoded data. Interestingly, the security of the elliptic curve multiplication is related to the discrete logarithm problem for elliptic curves, which is presumed to be a difficult problem.

Below, the ECDSA signing system is described together with a number of known attacks on ECDSA and possible countermeasures. Without countermeasures, these attacks could allow an attacker to retrieve the private key. Next, a few more advanced attacks are disclosed which even work when countermeasures are used against the less advanced attacks. It is desirable to find ECDSA implementations that protect also against these more advanced attacks.

Below we give a brief description of ECDSA. In an embodiment of ECDSA we have the following:

Elliptic curve E over finite field $\mathbb{F}$, with p elements, where $\mathcal{O} \in E$ denotes the identity element.

A point G on $E \subseteq \mathbb{F}_p \times \mathbb{F}_p$ of prime order q, i.e., $[q]G = \mathcal{O}$, where $[q]G$ denotes adding G q times to itself.

a function $\mu: \mathbb{F}_p \to \mathbb{Z}_q$ a hash function $H: \{0,1\}^* \to \mathbb{Z}_q$ signer's private key $x \in \mathbb{Z}_q^x$, and public key $P = [x]G \in E$ The security of the ECDSA algorithm depends on the fact that it is hard to obtain x from P. This is known as the ECDSA assumption. To sign a message M one may perform the following steps:

calculate h=H(M), where H is a cryptographic hash function (e.g., SHA256).

choose random $k \in \mathbb{Z}_q^x$ and calculate $[k]G = (([k]G)_1, ([k]G)_2)$, and $r = \mu(([k]G)_1)$ $s = (h+rx)k^{-1} \in \mathbb{Z}_q$ (repeat with new k if either r=0 or s=0)
the signature is (r,s)

The function μ maps an elliptic curve point, e.g., an elliptic curve point coordinate, to an integer. For example, μ may be mod q operation on the x-coordinate of the elliptic curve point. Throughout, in the various embodiments, elliptic curve points may be compressed elliptic curve points. In a compressed elliptic curve point, only the sign of the y-coordinate maintained, or the y-coordinate may not be maintained at all.

To verify a signature verification, one may, upon receiving M and the signature (r,s), calculate $\mu = s^{-1}H(M) \bmod q$, $s^{-1}r \bmod q$ and the point $C = (C_1, C_2) = [\mu]G + [v]P$ on E. The signature is valid if and only if $\mu(C_1) = r$. Note that the signature verification operation is not a sensitive operation, as no secret data is handled.

Scraping attacks. To attack ECDSA an attack may attempt to scrape x or k from the memory. If the attacker knows the value of k that was used in the calculation of the signature (r,s) of message M with hash h=H(M), then he can calculate the private key x as $x = r^{-1}(ks-h) \bmod q$. It is therefore important to counter attacks that simply scrape the value of k from the program memory. This could be done by making sure that k never appears in the clear in program memory. This holds for the value of x as well.

For example, to protect against an attack in which the secret value x is read from memory, one may try to encode x, and calculate only with the encoded x. Similarly, to protect against an attack in which the secret value k is read from memory, one may try to generate k directly in encoded form and calculate only with the encoded k.

problem occurs, if two signatures are generated using the same k, then the secret key x follows directly.

$$\left. \begin{array}{l} r_1 = (kG)_1 = r_2 = r \\ s_1 = k^{-1}(h_1 + rx) \\ s_2 = k^{-1}(h_2 + rx) \end{array} \right\} \Rightarrow x = r^{-1}(h_1 - h_2)^{-1}(h_1 s_2 - h_2 s_1)$$

An attacker can make this happen by replacing the output of a random number generator by an earlier output or a fixed value. This also works if k is encoded: the encoded value of k is replaced by the encoded value of k from an earlier run, or a fixed value. The fact that the attacker doesn't know the value of k is immaterial.

It is thus important that the number k must not be predictable by an attacker. For example, random number generators are commonly used to generate k. Unfortunately, using a random number generator in the context of white-box attacks is difficult. An attacker may attempt to replace the random number generator with a routine that returns a fixed value. Even if k were encoded, an attacker could try to replay a k value obtained in a previous run.

For example, suppose the random number generator calls the time of day function to generate a seed, then an attacker could replace the returned value by a fixed value, thereby effectively making k a constant. A solution to this problem is to use a deterministic algorithm for calculating an appropriate k from an input message M and optionally the private key x. In an embodiment, the parameters of the pseudo-random number generator are chosen randomly at compile time, so that they are different for each implementation. A function that maps an input message, or a hash thereof to a random multiplier to replace a random number generator, is called a de-randomization function. Using de-randomization function make the signatures that an implementation generates a deterministic function of the input.

A second reason why k is a particularly vulnerable parameter is that it must be used twice and then forgotten:

in the calculation of $r = \mu((kG)_1)$, in the calculation of $s = (h+rx)k^{-1}$.

Below a number of more advanced attacks are discussed. In a first attack the calculation of [k]G on the elliptic curve is targeted. Calculation of a multiple [k]G of point G on an elliptic curve is usually done via a Montgomery algorithm: each step in a Montgomery algorithm uses one or at most a few bits of k. By actively modifying these bits and observing how the resulting output changes, the actual value of all bits of k can easily be determined, even if these bits are encoded.

Deterministic k in combination with linear or blockwise non-linear encoding of k can be attacked as follows using fault attacks. The attacker feeds the same message four times.

zeroth run: no fault is injected, yielding signature $(r_0, s_0)$ first run: inject some fault in (one block of) encoded $k_0$, giving an encoded $k_1 = k_0 + \delta_1$ and yielding signature $(r_1, s_1)$ second run: inject another fault in encoded k (e.g., in another block), giving encoded $k_2 = k_0 + \delta_2$ and yielding signature $(r_2, s_2)$ third run: inject the sum of the faults in encoded k, yielding signature $(r_2, s_2)$ If the encoding is linear, or the two blocks don't interfere, then the effect on k in the third run is the sum of the effects in the first and second runs: $\delta_3 = \delta_1 + \delta_2$. The secret key x can then be found by linear algebra:

$$\begin{pmatrix} s_0 & 0 & 0 & -r_0 \\ s_1 & s_1 & 0 & -r_1 \\ s_2 & 0 & s_2 & -r_2 \\ s_3 & s_3 & s_3 & -r_3 \end{pmatrix} \begin{pmatrix} k_0 \\ \delta_1 \\ \delta_2 \\ x \end{pmatrix} = \begin{pmatrix} h \\ h \\ h \\ h \end{pmatrix} \bmod q$$

Block encodings are commonly used in white box encodings as the bit size of the underlying values, e.g., of the multiplier k, can be much larger than the bit size of the largest encoding that can be accommodated. These attacks show that there is a need to protect the multiplier k used in an ECDSA computation, and in particular to protect the multiplier k during the ECDSA multiplication.

FIG. 1 schematically shows an example of an embodiment of a point multiplication device 100. Point multiplication device 100 is arranged to compute a point multiplication kG on an elliptic curve E between a multiplier k and a base point G on the elliptic curve E. A pointed out above point multiplication on an elliptic curve is a primitive needed for a number of cryptographic protocols. In particular, point multiplication device 100 may be used to compute an ECDSA signature. Such an example is detailed with respect to FIG. 4.

Point multiplication device 100 comprises a storage 110. Storage 110 stores parameters needed for the point multiplication, e.g., parameters derived from the cryptographic protocol in which it is used. In particular, storage 100 storages the base point G and also multiple pre-computed auxiliary points $G_i$ on the elliptic curve. In an embodiment, the point multiplication kG is translated into a number of point multiplications for points G, and $G_i$, in such a way that it is hard to recover k from the multipliers used with these points. This allows the elliptic curve arithmetic implementation to be less protected than other parts of point multiplication device 100, and even in plain. In particular, in an embodiment the elliptic curve arithmetic is not implemented in a white-box fashion, e.g., does not operate on encoded data. In addition to the mentioned curve points, storage 110 may comprise additional data; some examples of which are given herein. For example, if point multiplication device 100 implements encoded parts, e.g., white-box implemented parts, using table networks operating on encoded data, then the look-up tables in the table network may be stored in storage 110.

Point multiplication device 100 further comprises an input interface 120 arranged to receive a base hash h, 122 of an input message M. For example, the input interface 120 may be an application programming interface (API) used by some application. For example, point multiplication device 100 may be implemented as a subroutine of a larger application, e.g., an ECDSA application. Point multiplication device 100 may also be implemented as a cooperating application, e.g., a library, called by, say, an ECDSA application when needed.

In an embodiment, point multiplication device 100 comprises a hash unit arranged to receive the input message M and compute the hash h, 122. The output of the hash and the input to the point multiplication described below may be formed by input interface 120. Computing of base hash 122 may be done in plain, as the base hash is not confidential. The hash function unit may be adapted to compute the hash in an encoded manner. The latter is not necessary though. Input interface 120 may receive the input message in plain form.

In an embodiment, input interface may comprise or cooperate with a communication interface which is used to obtain base hash 122 or the input message M. For example, the communication interface may be a wired interface, e.g., a wired connection. For example, the communication interface may comprise a connection pad or connection port. The communication interface may also be digital wired network connection, or a wireless network connection, or a hybrid, etc. For example, the communication interface may comprise an antenna.

Point multiplication device 100 comprises a processor circuit arranged for the elliptic curve point multiplication. The execution of the elliptic curve point multiplication is implemented in a processor circuit, examples of which are shown below. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may be wholly or partially implemented in hardware, e.g., a multiple semi-conductor gates cooperating to implement one or more of the particular functional units shown in FIG. 1. For example, the functional units shown in FIG. 1 may be wholly or partially implemented in computer instructions that are stored at the point multiplication device and are executable by a microprocessor of the point multiplication device. In hybrid embodiments, functional units are implemented partially in hardware, e.g., as coprocessors, e.g., crypto coprocessors, and partially in software stored an executed on the point multiplication device. The electronic point multiplication device 100 may be configured for a cryptographic protocol, such as the ECDSA signing operation.

Point multiplication device 100 is configured to derive the multiplier k and multiple derived hashes $h_i$ from the base hash h, 122 in the form of a first set of multiple joint encodings. The first set comprises the multiple derived hashes each of which is jointly encoded with the multiplier k. In formula: $A_i = \mathrm{Enc}(k, h_i)$, $i = 0 \ldots 2n-1$, 221-223. For example, point multiplication device 100, e.g., the processor circuit, may be configured with a first encoded computation network 130 arranged to compute the first set of multiple joint encodings.

Figure 2:
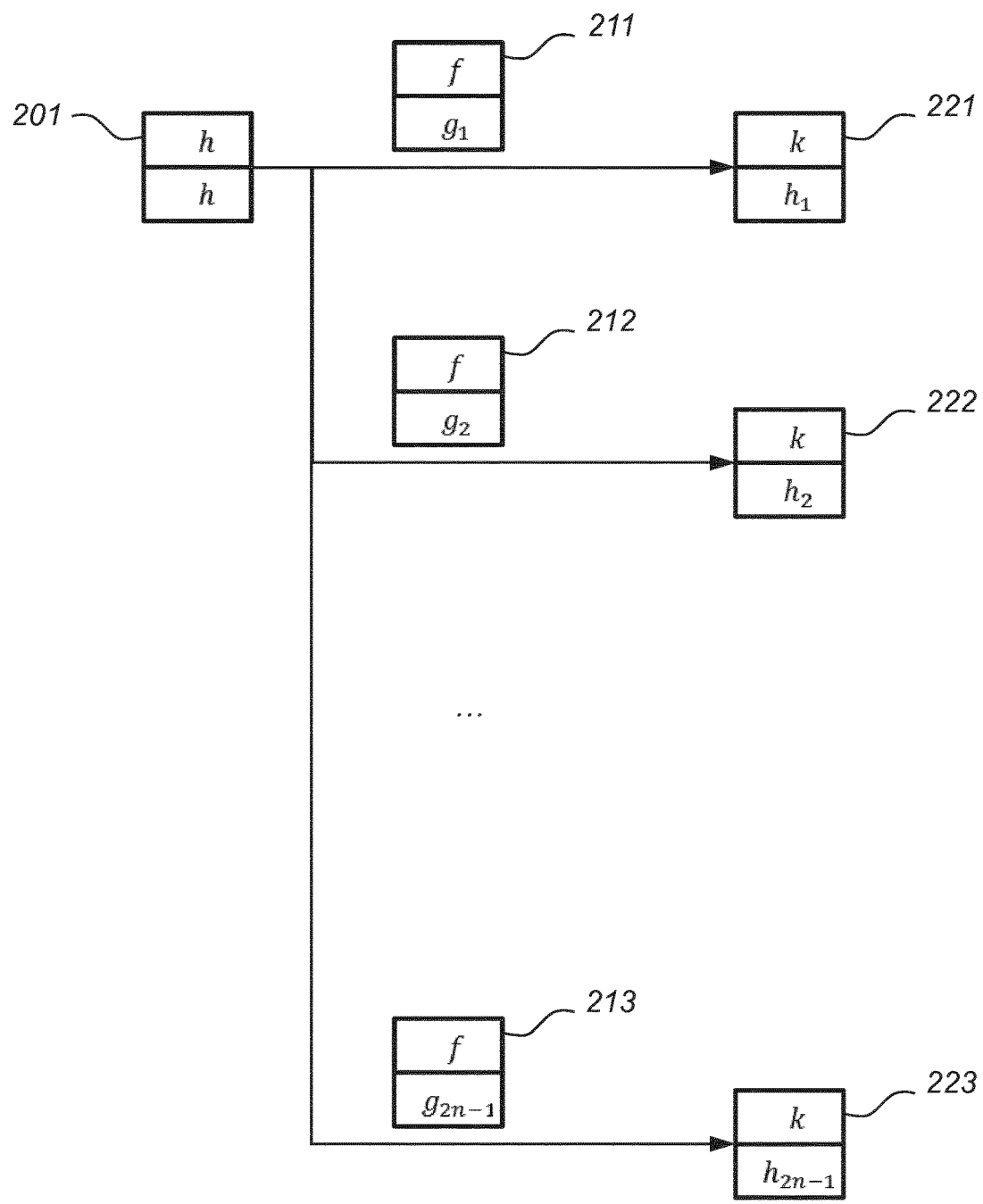

FIG. 2 schematically shows an example of an embodiment of deriving a first set of multiple joint encodings. For example, the system of FIG. 2 may be used by first encoded network 130. Show in FIG. 2 is a joint encoding of the base hash 201, e.g., base hash 122, with itself. Two blocks positioned above each other, as in 201, is used in FIGS. 2 and 3 to indicate a joint encoding.

When referring to encoded data, it is understood that a secret encoding is used. For example, at compile time encodings for the various data items are chosen. For example, such an encoding may be a bijective function, and may be randomly chosen. When data is plain or in a plain format, the data is represented in a public encoding. For example, a letter represented in the program in, say, ASCII is plain, because the ASCII representation is public. But if the letter were mapped through a private or secret bijection, mapping 8 bits to 8 bits, then the letter is encoded.

The notation 'Enc' denotes an encoding with a private encoding. Such an encoding may be chosen randomly at compile time. For example, the encoding may be a bijection that maps a bit sequence of a certain size to bit sequences of the same size. It is understood, that each encoding may be a different encoding, as the encoded networks that receive, operate on, or produce such encoded data may be adapted for any specific encoding. Using multiple different encodings, makes attack of the encoding harder. Even though the same notation 'Enc' is used without super or sub scripts, it is understood that each one them, may be, and preferably, are, different encodings.

For example, the base hash 122 jointly encoded with itself 201 may be notated as Enc(h, h). A joint encoding may be a block-wise joint encoding, in which the inputs are partitioned into blocks and a smaller joint encoding is applied to a block of a first input and a block of a second input. The encodings may be byte-wise or nibble-wise joint encodings. For example, a joint encoding Enc operating on a first data item a and a second data item b may comprise a sequence of smaller encodings, e.g., $Enc_i$, the first and second data item being a first and second sequence of smaller data items $a_i$, and $b_i$; the two sequences preferably have the same length. The smaller encoding $Enc_i$ may jointly encode $a_i$ and $b_i$, e.g., as $Enc_i(a_i, b_i)$. The encoding $Enc_i$ may be a bijection. For example, $Enc_i$ may be implemented as a look-up table. For example, the smaller data items $a_i$ and $b_i$ may be nibbles or bytes, and $Enc_i$ may be a bijection from 8 bits to 8 bits or from 16 bits to 16 bits. These are convenient numbers, but encodings on other block sizes are also possible, e.g., in 3 or 5 bits. The smaller encodings $Enc_i$ may be chosen randomly, e.g., at compile time.

For example, in an embodiment, first encoding network 130 receives the base hash 122 in the plain, e.g., in a public encoding, and first jointly encodes the base hash 122. For example, the base hash may be received as a sequence of nibbles, each of which is jointly encoded with itself through a smaller encoding.

FIG. 2 further shows a first set of jointly encoded function pairs ($f$, $g_i$). An encoded function pair is an encoded computation network or part thereof such that a first component of the encoded function pair, e.g., $f$ in this example, operates on a first component of a joint encoding, e.g., h in this example, and a second component of the encoded function pair, e.g., $g_i$ in this example, operates on a second component of a joint encoding, e.g., also h in this particular example.

In principle, there is no limit to the functions that may be implemented as an encoded computation network; any function may in principle be implemented in this fashion. However, the inventors found that so-called Substitution-Linear Transformation (SLT) type ciphers which are known from block-cipher design may be particularly efficiently adapted for use as de-randomization function $f$ and diversification functions $g_i$. In an SLT type block cipher multiple substitution layers, linear transformation layers and key-addition layers are alternatingly applied to an input to produce a key dependent encrypted output. To adapt such constructions to point multiplication device 100 one may eliminate the key-addition layer or, e.g., modify the key addition layer to a fixed, e.g., random, key; a key-addition layer with a fixed key may then be combined with a linear layer that comes before or after it. Substitution layers may be efficiently implemented as a sequence of substitution boxes, e.g., implemented as look-up tables. Efficient implementations of linear operations on encoded inputs are also known. An example, of an SLT block cipher that may be adapted in this way is AES.

Encoded network 130 may be implemented using white-box cryptography. A white-box implementation is a cryptographic implementation designed to withstand an attack in the white-box context. In the white-box context, the attacker has total visibility into software implementation and execution. Even so, the white-box implementation aims to prevent the extraction of secret keys from the program.

In white-box cryptography operations are performed on encoded data, e.g., by applying a bijective function on the data, possibly together with a salt. The computer program is then represented as a table network that operates on the encoded data. An example of such an implementation can be found in "White-Box Cryptography and an AES Implementation", by S. Chow et al. (incorporated by reference). In the paper "A White-Box DES Implementation for DRM Applications" by S. Chow, et al. a white-box implementation of the Data Encryption Standard (DES) is presented (incorporated by reference). These papers show how, through several intermediate methods, a normal cipher may be transformed to an implementation in white-box form, so that a table-network can be used to compute the block cipher. In particular, these papers show how to implement SLT ciphers, and their components, such as substitution layers and linear layers. A table-network may be implemented as multiple encoded and cooperating look-up tables stored on a storage of the device. A table network receives one or more inputs and produces one or more outputs. In a table network, multiple look-up tables may be used, e.g., stored in a table storage. Tables take inputs directly from the inputs and/or the outputs of other tables. A table may take a single input, two inputs, or more than two inputs.

FIG. 2 shows that multiple jointly encoded function pairs, shown are jointly encoded function pairs 211-213, are applied to the jointly encoded base hash 201 to produce joint encodings of the multiplier and a diversified hash. Note that each of the pairs of joint encoded function pairs contains the same de-randomization function $f$, so that each of the produced joint encodings contains the multiplier k. FIG. 2 shows joint encodings 221-223, each of which contain the same multiplier. Note that the encodings used in the joint encodings, e.g., joint encodings 221-223, may be different. Moreover, the used encoding is not known to the attacker, e.g., it may be secretly chosen by a designer, or even randomly at compile time. The number of joint encodings equals 2n, in which n is a security parameter; preferably, n is at least 2.

The de-randomization function $f$ replaces a random number generator. It may take as input the base hash, but may in addition also receive as input the private key of point multiplication device 100. The hash diversification functions serve to diversify a single hash into multiple hashes. Both the de-randomization function and the diversification functions may be random functions. They may reduce their domain if needed. For example, if the base hash is SHA-256 hash with 256 bits, the functions $f$ and/or $g_i$ may map to a smaller domain, e.g., to 80 bits.

In an embodiment, the jointly encoded functions apply to a singly encoded hash, Enc(h) instead of a joint encoding Enc(h, h). In an embodiment, the jointly encoded function pairs apply directly to a plain representation h of the bash hash and incorporate encoding as well as the encoded function operations. To select a random function, a designer may fix a function template, e.g., an SLT type function, with a number of S-rounds and a number of L-rounds, e.g., 8 of each, a size of the substitution boxes, say 4 or 8 bits wide, a bit-size of the input and output, e.g., 256 and 80 respectively, and select the substitution boxes and linear transformation randomly within these parameters. The substitution boxes and linear transformations are preferably invertible. Other numbers of rounds or sizes of the s-box or linear transformations, etc., are possible.

Returning to FIG. 1. In addition to computing a first set of multiple joint encodings, of the multiplier and the diversified hashes, point multiplication device 100 also computes a second set of multiple joint encodings. The second set of joint encodings also comprises the derived hashes though not necessarily the multipliers. The derived hashes in the second set are the same derived hashes as in the first set, although probably in a different encoding. Mathematically, the second set may be chosen as $B_i=Enc(h_{2i}, h_{2i+1})$, $i=0 \ldots n-1$. The precise pairing chosen in the second set is not important. Instead of pairing the first derived hash with the second derived hash, and so on, one may choose any pairing, e.g., a random pairing between the derived hashes. For example, point multiplication device 100, e.g., the processor circuit, may comprise a second encoded computation network 135 to compute the second set.

Figure 3:
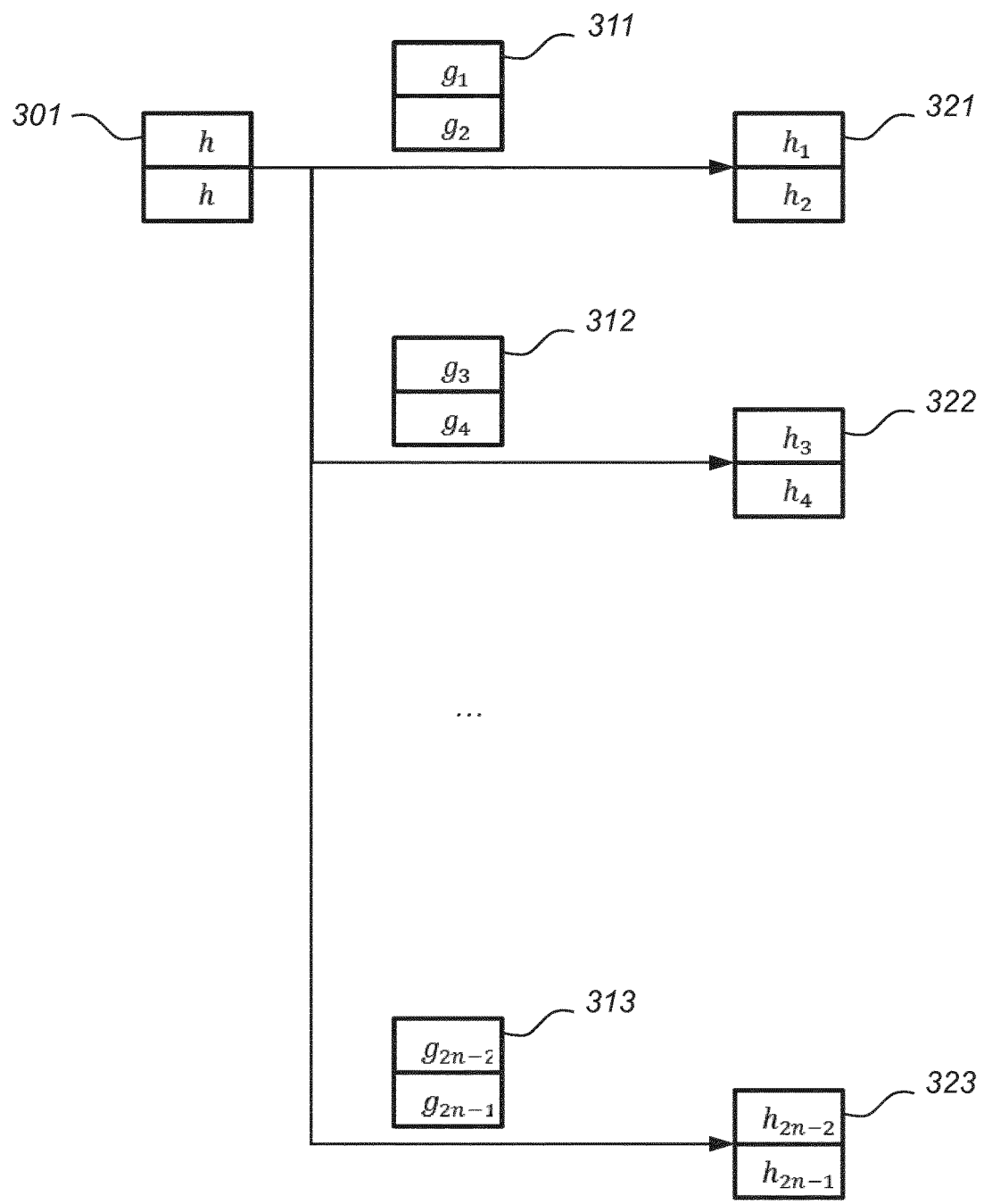

FIG. 3 schematically shows an example of an embodiment of deriving a second set of multiple joint encodings. FIG. 3 is similar to FIG. 2, and the same type of encodings, etc., that can be used in FIG. 2 may be used in FIG. 3. Shown in FIG. 3 is a joint encoding 301 of the base hash 122 with itself. This may be the same encoding as 201, e.g., the same encoded data is used as an input to first encoded network 130 and to second encoded network 135. Second encoded network 135 comprises multiple encoded function pairs. Each function pair comprising at least two of the diversification functions $g_i$. These function pairs could also comprise additional diversification functions to obtain jointly encoded triples of derived hashes, or even more, etc. Shown in FIG. 3 are jointly encoded functions 311-313, that produce joint encodings 321, 322 and 323.

Returning to FIG. 1. In this way, point multiplication device 100 obtains two different ways to encode the diversified hashes $h_i=g_i(h)$: once jointly encoded with the multiplier k, and once jointly encoded with themselves. Point multiplication device 100 will eventually compute the point product of the multiplier k and the base point G as a sum of multiples of the base point and additional auxiliary points $G_i$. The multiplier of the G and $G_i$ are sometimes computed from the first set and sometimes from the second set, so that an attacker cannot attack only one of the two sets; he is forced to attack both the first set and the second set simultaneously. The multiple pre-computed auxiliary points $G_i$ may have been obtained as a point multiplication between a pre-computed multiplier and the base point. Interestingly, due to the difficulty of the discrete logarithm problem, the attacker cannot find the relationship between G and $G_i$, e.g., he cannot find coefficients $s_i$ so that $G_i=s_iG$. However, this knowledge is embedded in the encoded networks, so that the processor circuit is able to blind a computation kG as multiple computation over the G and $G_i$. An attacker is not able to reversely obtain k from the blinded computation since he cannot know with how much G was multiplied to obtain $G_i$.

The encoding of multiplier k together with h provides protection. To explain, consider a situation in which the multiplier and the base hash are bitwise encoded together. Then there are three possible changes to an encoded bit pair that could be caused by a modification by the attacker:

i. only the bit of k changes, h is unchanged
ii. only the bit of h changes, k is unchanged
iii. both the bit of k and the bit of h change Note that only the first change is useful for the attacker. The second and third changes do not give a correct signature, because h is changed. Even in this scenario, an attacker is already forced into three times as much work. n an embodiment, where a further security parameter n is used the likelihood of the attacker injecting faults that cause a meaningful signature becomes even smaller. In an embodiment, multiple (n) different $h_i$ are used. A bit of k need not be encoded together with bits of the original hash, but rather it may be encoded together with a bit of n different hashes. In an embodiment, the multiplier k and all $h_i$ have the same bitlength, though this is not necessary.

Returning to FIG. 1. The processor circuit is configured to compute from the first set of multiple joint encodings $A_i$ a blinded base multiplier A, 131. For example, first encoding network 130 may be configured to compute blinded base multiplier A as well. Furthermore, the processor circuit, e.g., second encoded network 135, is configured to compute from the second set of multiple joint encodings $B_i$ multiple blinded auxiliary multipliers $\eta_i$, 136. The multiple blinded auxiliary multipliers correspond to the multiple auxiliary points $G_i$.

These computations may also be done in an encoded form. For example, the white-box implementations indicated above may be adapted to compute A and $\eta_i$, e.g., as encoded table networks. Constructing such table-networks may use encoded Montgomery digit-based arithmetic. There are many ways to do this, one particular way is further expanded upon below.

Interestingly, the blinded base multiplier and the multiple blinded auxiliary multipliers may be represented in a plain format during the performing of the blinded elliptic curve arithmetic. In fact, in an embodiment these numbers may be plainly visible in any ordinary base 2 arithmetic, etc., plain to see for an attacker of this system. The particular computation of the blinded base multiplier and the multiple blinded auxiliary multipliers however is encoded. For example, in an embodiment one may first compute the blinded base multiplier and the multiple blinded auxiliary multipliers in an encoded format, followed by a decoding step. The blinded base multiplier and the multiple blinded auxiliary multipliers are called blinded, not because they need to be encoded but because they blind the true ECC computation (kG) from the attacker.

Note that, in an untampered execution, all k that are encoded in the first set, i.e., values $A_i$, are the same, but in a tampered run these may differ. For clarity, we will refer to the value of k encoded in $A_i$ as $k_i$. In an untampered run, we have $k=k_i$, for $0 \leq i \leq 2n-1$.

In an embodiment, the value of the blinded base multiplier may be computed as $A=K+\Sigma_i C_i H_i$, wherein we have $K=\Sigma_i \alpha_i k_i$, $H_i=h_i+\Sigma_j \beta_{i,j} k_j$. For example, A may be computed in an encoded network, e.g., using Montgomery digit based arithmetic, taking the value $A_i$ as input. The constants $\alpha_i$, $\beta_i$ and $C_i$ were selected compile time in $Z_q$, and may be hardcoded in the algorithm. We may have $\Sigma_i \alpha_i=1$ and $\Sigma_j\beta_{i,j}=0$. For example, one may first compute the values K and $H_i$ in encoded form, e.g., jointly encoded as (K, $H_0, \ldots, H_{2n-1}$) and compute A therefrom.

Note that blinded base multiplier (A) is a weighted sum of the multipliers $k_i$ and diversified hashes $h_i$ in the first set of multiple joint encodings. Thus, the ECC computation AG will contain the correct result kG if the run is untampered, but blinded by a term ($\Sigma_i C_i H_i$). The multiple blinded auxiliary multipliers $\eta_i$ are selected to correct for the latter term, e.g. for the diversified hashes in the weighted sum A.

The blinded auxiliary multipliers may be obtained by recoding the encoded $B_i$ values $B_i=(h_{2i},h_{2i+1})$ to the values $(\eta_{2i}, \eta_{2i+1})=(a_i h_{2i}+b_i h_{2i+1}, c_i h_{2i}+d_i h_{2i+1})$, the values $\eta_i$ are plain values. Intermediate values may be encoded, even if the final values are plain. The recoding of the derived hashes is done so that it compensates for the auxiliary points which are later added to the base point multiplication. For example, one may set $G_{2i}=[-(a_i d_i - b_i c_i)^{-1}(d_i C_{2i} - c_i C_{2i+1})]G$, and $G_{2i+1}=[-(a_i d_i - b_i c_i)^{-1}(-b_i C_{2i} + a_i C_{2i+1})]G$.

Note that one could compute $\eta_i$ from the $A_i$, or even directly from h, but this would violate the security. Namely, to get a correct fault an attacker has to shoot in $A_i$, not touching $h_i$. If the attacker did hit $h_i$ then there will be an $h'_i$ in $A_i$, inconsistent with an $h_i$ in one of the $B_j$, leading to an output which is not usable by the attacker.

Finally, the elliptic curve arithmetic is performed to obtain the point multiplication 141, kG of the multiplier k and the base point G. This computation is blinded in the sense, that different computations are performed visual to an attacker, the correct outcome kG can be derived from the outcomes of the blinded elliptic curve arithmetic but the correct input k cannot be derived from the inputs of the blinded elliptic curve arithmetic. The multiplier k has been distributed over the multiple new multipliers in a secret manner, as this part of the computation is done in encoded form the multiplier k cannot be recovered.

The blinded elliptic curve arithmetic comprises computing the point addition of:
- the point multiplication of the blinded base multiplier and the base point on the elliptic curve, and
- the multiple point multiplications of a blinded auxiliary multiplier and an auxiliary point.

That is, one computes kG as $AG+\Sigma_i \eta_i G_i$, the latter computation may be done entirely plain. Note that there are 2n+1 elliptic curve multiplications If needed, the ECDSA component may be computed from kG as $r=\mu(kG)$. This computation is also plain.

The parameters are selected at compile time, and may be hardcoded in point multiplication device 100. For example, the compiler may be configured to
- Select constants $\alpha_i$, $\beta_i$ and $C_i$ in $Z_q$, such that $\Sigma_{0\leq i\leq n-1}\alpha_i=1$, and $\Sigma_{0\leq j\leq 2n-1}\beta_{i,j}=0$.
- Select integers $a_i$, $b_i$, $c_i$, $d_i$ in $Z_q$ that satisfy $a_i d_i - b_i c_i \neq 0$.
- Select a de-randomization function $f$ from a hash to $Z_q$, and hash diversification functions $h_i$ for $0\leq i\leq 2n-1$
- Compute elliptic curve points (plain) such that $G_{2i}=-(a_i d_i - b_i c_i)^{-1}(d_i C_{2i} - c_i C_{2i+1})G$, and $G_{2i+1}=-(a_i d_i - b_i c_i)^{-1}(-b_i C_{2i}+a_i C_{2i+1})G$.

Note that if the multiplier is needed in some further part of the cryptographic protocol, it can be computed in an encoded network form the base hash again. For example, if the cryptographic protocol is ECDSA, a further part of the algorithm is to compute the second component of the signature also needs the multiplier k. This can be provided by re-computing k from the base hash in an encoded network of the second part of the cryptographic protocol. For example, that encoded network may comprise an encoding of the de-randomization function.

Below some additional information is provided on details of one particular embodiment point multiplication device 100. Let the input h=HASH(M), i.e., the first step in ECDSA, an example computation of the first component of the signature is as follows. Assumed are the following blocks:

- A (collection of random bijective) encoding function(s) E operating on $2\ell$ bits.
- A collection of Substitution Linear Transformation $\{SLT^i\}_i$ functions (such as AES, e.g., with a fixed key) that maps $\ell*m$ bit inputs to $m*\ell$ bit outputs, using $\ell$ bit operations internally (example $\ell=8$ in AES).
- White box circuits for jointly encoded functions $C^{0,i}=\{SLT^0, SLT^{i+1}\}_i$ and $C^{2i+i,2i+2}=\{SLT^{2i+1}, SLT^{2i+2}\}_i$. That is, each circuit $C^{i,r}$ gets two $m\ell$ inputs, say $I_l, I_r$, in some encoded way (see below) and computes (an encoding of) the outputs $O_l=SLT^i(I_l)$ and $O_r=SLT^j(I_r)$. This circuit has for example an $\omega$ path and a $\sigma$ path where the $\omega$ path computes $SLT^i$ and the $\sigma$ path computes $SLT^j$.
- A digit based modular multiplication network that computes $w=u*v*R^{-1} \bmod q$ on input
  - puts $R=b(m+1)$ is the "Montgomery constant".
  - $u=\Sigma_{i=0}^m u_i b^i \bmod q$ and
  - $v=\Sigma_{i=0}^m v_i b^i \bmod q$, where
  - $u_i$ and $v_i$ are $\ell$-bit digits, and hence
  - $b=2^\ell$.

For Digit Based Montgomery see, e.g., Peter L. Montgomery, "Modular multiplication without trial division". *Mathematics of Computation*, 44:519-521, 1985. All internal operations are on one or two $\ell$ bit digits, and so they can be put in a table; For example, using so-called schoolbook multiplication.

- White-box circuits implementing the Digit Based Montgomery (DBM) modular multiplication, where the circuit gets four m digit inputs, say $x_0, x_1$ and $y_0, y_1$. The $\omega$ path of the circuit computes $x_0 y_0 \bmod q$ and the $\sigma$ path computes $x_1 y_1 \bmod q$.
- Finally, two white-box addition circuits, these may use schoolbook addition. The first one ADD1 like DBM that the circuit gets four m digit inputs, say $x_0, x_1$ and $y_0, y_1$. The $\omega$ path of the circuit computes $x_0+y_0$ and the $\sigma$ path computes $x_1+y_1$. The second one ADD2 where the circuit gets one encoding of two m digit inputs, say x (in the $\omega$ part) and y (in the $\sigma$ part), and computes x+y in the $\omega$ path en something arbitrary in the $\sigma$ part.

Examples of computing different functions on a different, but jointly encoded variables may be found, e.g., in Computing device comprising a table network, WO/2014/095772; Cryptographic device for calculating a block cipher, WO/2016/173882; Secure data transformations, WO/2015/091172, etc.

Using these components, the computation may work as follows:
1. split h into blocks of $\ell$ bits $h^0, \ldots, h^m$ so that $h=h^0\|\ldots\|h^m$.
2. Use E to create m encodings $\tilde{h}_i=E(h^i\|h^i)$.
3. Feed $\tilde{h}_0\|\ldots\|\tilde{h}_m$ to each $C^{i,j}$.
4. Get a collection of results in this way $0^{i,j}=E(o_0^i\|o_0^j)\|\ldots\|E(o_m^i\|o_m^j)$ such that $$o_0^i\|\ldots\|o_m^i = SLT^i(h),$$

and $$o_0^j\|\ldots\|o_m^j = SLT^j(h).$$

Figure 4:
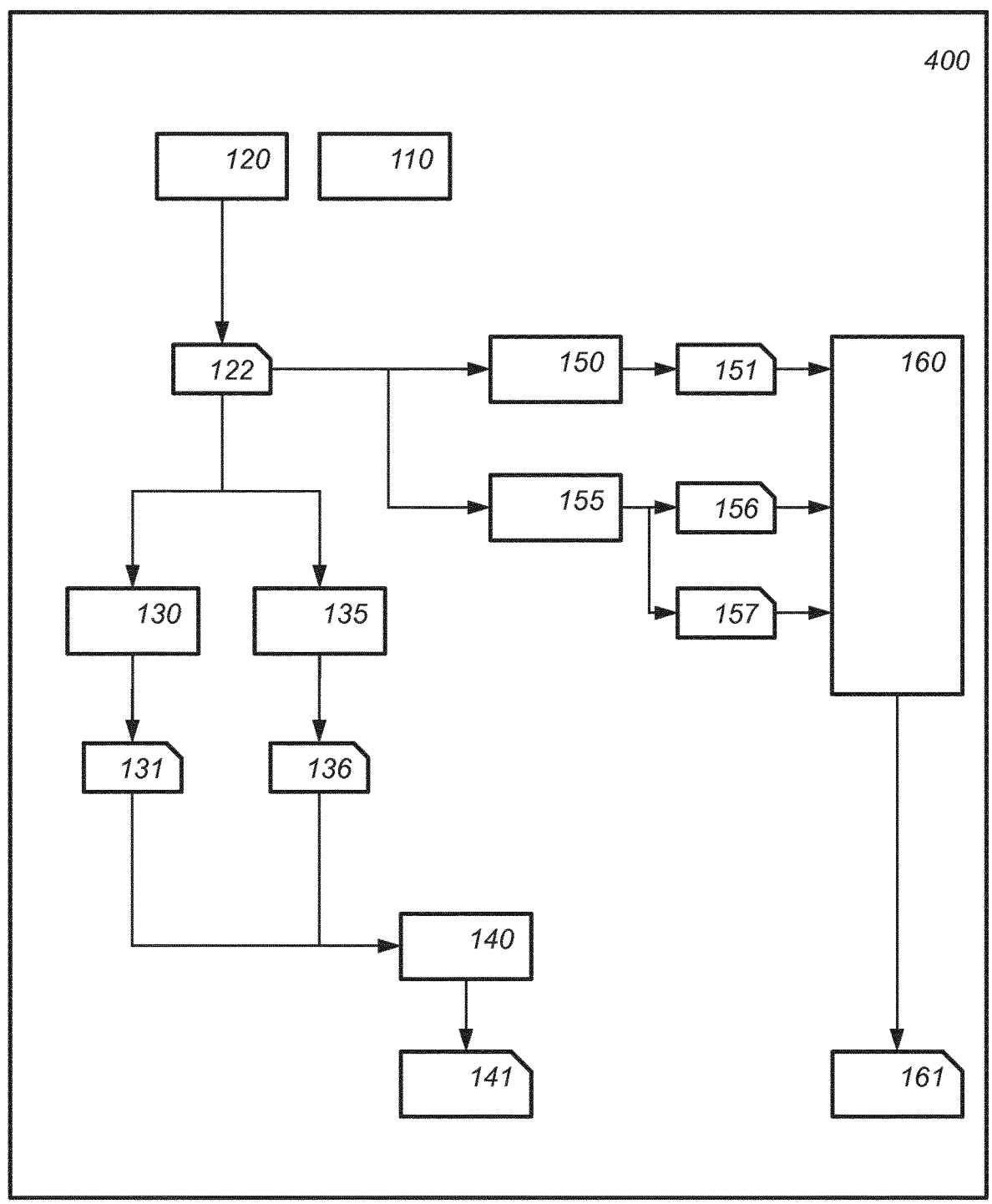

5. Define $k=SLT^0(h) \bmod q$, and $h_i=SLT^{i+1}(h)$ for $1 \le i \le 2n$.
6. Then $A_i=0^{0,i+1}$ for $0 \le i \le 2n-1$ and $B_j=0^{2j+1,2j+2}$ for $0 \le j \le n-1$.
7. Define $\text{Enc}(a, b)=E(a_0\|b_0)\| \ldots \|E(a_{nv}\|b_{nv})$, where $m' \ge m$ in order to prevent overflow.
8. Run DBM on input $A_i=\text{Enc}(k, h_i)$ and (precomputed) $\text{Enc}(c_i^1, c_i^2)$ where $c_i^1=\alpha_i+C_i\Sigma_j \beta_{i,j}*R^2 \bmod q$ and $c_i^2=C_i*R \bmod q$. The Results satisfy $$\tilde{A}_i=\text{Enc}(k(\alpha_i+C_i\Sigma_j\beta_{i,j}*R) \bmod q, h_iC_iR \bmod q)$$

are "in Montgomery form". NOTE: to prevent overflow (after the additions) we add some encodings of leading zero's to $A_i$ in $\text{Enc}(k, h_i)$.
9. Compute $Z_i=\text{ADD1}(Z_{i-1}, \tilde{A}_i)$, for all $0 \le i \le 2n-1$, where $Z_0=\tilde{A}_0$.
10. Compute $Z=\text{Enc}(A*R \bmod q, \cdot)=\text{ADD2}(Z_{2n-1})$.
11. Compute $\text{Enc}(A, \cdot)$ with DBM on input Z and (precomputed) $\text{Enc}(I, \cdot)$.
12. Decrypt and return A mod q FIG. 4 schematically shows an example of an embodiment of an ECDSA device 400. An important application of point multiplication device 100 is in an ECDSA device, such as ECDSA device 400. A pointed out above an ECDSA signature comprises two components, one of which is derived from an ECC point multiplication. FIG. 4 shows an ECDSA device 400, e.g., a device configured to compute an ECDSA signature for a message, which comprises a point multiplication device, such as point multiplication device 100. Similar reference signs in FIG. 4 correspond to similar functionality in FIG. 1.

ECDSA device 400 comprises a processor circuit, e.g., a processor circuit as in point multiplication device 100 but extended with additional functionality. ECDSA device 400 comprises an input interface 120 arranged to receive a base hash h, 122 of an input message M. As for point multiplication device 100 the input interface may be an application interface, so that ECDSA device 400 is configured to receive or generate or otherwise obtain the input message. ECDSA device 400 may comprise a hash unit to produce the base has of the input message. ECDSA device 400 comprises a point multiplication device, such as point multiplication device 100 to compute a point multiplication kG on an elliptic curve between a multiplier k and a base point G on the elliptic curve E for use in a cryptographic protocol. For example, the processor circuit of ECDSA device 400 may be configured for said point multiplication.

The processor circuit of ECDSA device 400 is further configured to obtain a first component $r=\mu(([k]G)_1))$ of the signature from the point multiplication kG on the elliptic curve between the multiplier k and the base point G. The latter computation may be done in elliptic curve arithmetic unit 140, or in a separate unit. The computation of μ may be done in plain.

ECDSA device 400 is further configured to compute a second component $(s=(h+rx)k^{-1}))$ of the signature. The second computation does not involve elliptic curve computations. This means that an encoded arithmetic network could perform this computation. For example, an encoded network of ECDSA device 400 may receive the base hash and comprise an encoding of the de-randomization function f. This allows such an encoded network to compute an encoding of the multiplier k. The encoded network further may use an encoding of the private key x, and the values r and h. The latter two may be received in plain or in an encoding. From these input the second component of an ECDSA signature may be computed.

However, in an advantageous embodiment, it is avoided to perform the inverse operation in encoded form. Although computation of the inverse while operating on encoded data is possible, it requires a complicated encoded network. The inventors have devised a simpler way to obtain the second component of the signature without revealing the value of the multiplier k. This embodiment can withstand the advanced attacks on k and simple memory scraping on x.

ECDSA device 400 is configured to a further first set of multiple joint encodings and a further second set of multiple joint encodings. For example, ECDSA device 400 may comprise a third encoded computation network 150 configured to derive multiple derived hashes each of which is jointly encoded with the multiplier k. Mathematically $X_i=\text{Enc}(k, t_i)$, $i=0 \ldots 2n-1$. For example, third encoded computation network 150 may be configured to apply multiple pairs of encoded functions (f, g'$_i$), where the g'$_i$ are a further set of diversification functions.

For example, ECDSA device 400 may comprise a fourth encoded computation network 155 configured to derive the same multiple derived hashes as in the further first set but each being jointly encoded with the base hash h. Mathematically $Y_i=\text{Enc}(h, t_i)$, $i=0 \ldots 2n-1$. For example, fourth encoded computation network 155 may be configured to apply multiple pairs of encoded functions (id, g'$_i$), where the g'$_i$ are the further set of diversification functions. Herein id stands for the identity function. Note that even the identity function will not be visible as such, as it may produce its output in a different encoding then it received its input. Moreover, the joint encoding will also cause the base hash to be directly visible in the device.

To compute $k^{-1}$ mod q under the encoding we proceed from the sets $X_i$ and $Y_i$, e.g., from
encoded pairs $\text{Enc}(k, \text{Enc}(k, t_0), \ldots, \text{Enc}(k, t_{2n-1})$ and
encoded pairs $\text{Enc}(h, t_0), \ldots, \text{Enc}(h, t_{2n-1})$ From the further first set of multiple joint encodings $X_i$ a blinded multiplier B, 151 is computed as a weighted average of the encoded multipliers in the further first set times a weighted average of the encoded multipliers and derived hashes in the further first set. For example, we may compute as follows: Let k'$_i$ denote the decoded k value of $\text{Enc}(k, t_i)$, and compute $K'=\Sigma_i \gamma_i k'_i$, e.g., with $\Sigma_i \gamma_i=1$. Also compute $T_i=t_i+\Sigma_j \delta_{i,j} k'_j$ with $\Sigma_j \delta_{i,j}=0$. The blinded multiplier is computed as $B=K' \cdot \Sigma_i D_i T_i$, where $D_i$ are chosen compile time. For example, one may first create an encoded 2n+1 tuple $\text{Enc}(K', T_0, \ldots, T_{2n-1})$ over $\mathbb{Z}_q^{2n+1}$, and compute the blinded multiplier from that. Note that the value B need not be encoded, it can be outputted in plain format.

Further, ECDSA device 400 may compute from the further second set of multiple joint encodings $Y_i$ a blinded base hash H, 156 as a weighted average of the encoded base hashes in the further second set, and a de-blinding T', 157 value from the encoded base hashes and derived hashes. This computation may be done in an encoded network, and produce encoded values. For example, let $h_i$ denote the decoded h value of $\text{Enc}(h, t_i)$, and compute $H=\Sigma_i\mu_i h'_i$, e.g., with $\Sigma_i \mu_i=1$ and $T'_i=t_i+\Sigma_j v_{i,j} h_j$, e.g., with $\Sigma_j v_{i,j}=0$. The de-blinding value may be computed as $T'=\Sigma_i D_i T'_i$. For example, one may create an encoded 2n+1 tuple $\text{Enc}(H, T'_0, \ldots, T'_{2n-1})$ over $\mathbb{Z}_q^{2n+1}$. The blinded hash and deblinded value may be jointly encoded, e.g., from $\text{Enc}(H, T'_0, \ldots, T'_{2n-1})$ compute $\text{Enc}(H, T')$, where $T'=\Sigma_i D_i T'_i$.

The second component of the signature can now be computed in an encoded circuit 160 to compute $s=B^{-1}T'$ $(xr+H)$mod q; for example, taking as input $B, r, \text{Enc}(x)$, $\text{Enc}(H, T')$, and using for example a digit-based Montgomery circuits. Note that inverting is done over a plain value B.

The rest of the computation may be done on encoded values. The end result s also does not need to be encoded. Advantageously, the encodings (Enc) are linear over $\mathbb{Z}_q$ and on top of that digit-wise non-linear, e.g., $\text{Enc}(u,v)=z=z_0\|\ldots\|z_\ell=E(x_0\|y_0)\|\ldots\|E(x_\ell\|y_\ell)$, where E is some secret bijective mapping chosen at compile time, and $x_0\|\ldots\|x_\ell=x=a*u \bmod q$ and $y_0\|\ldots\|y_\ell=y=b*v$, for some compile time chosen a, b.

In the various embodiments of point multiplication device 100 and ECDSA device 400, the input interface may be selected from various alternatives. For example, input interface may be a network interface to a local or wide area network, e.g., the Internet, a storage interface to an internal or external data storage, a keyboard, an application interface (API), etc.

Storage 110 may be implemented as an electronic memory, say a flash memory, or magnetic memory, say hard disk or the like. Storage 110 may comprise multiple discrete memories together making up storage 110. Storage 110 may also be a temporary memory, say a RAM. In the case of a temporary storage 110, storage 110 contains some means to obtain data before use, say by obtaining them over an optional network connection (not shown).

Typically, the devices 100 and 400 each comprise a microprocessor (not separately shown) which executes appropriate software stored at the devices 100 and 400; for example, that software may have been downloaded and/or stored in a corresponding memory, e.g., a volatile memory such as RAM or a non-volatile memory such as Flash (not separately shown). Alternatively, the devices 100 and 400 may, in whole or in part, be implemented in programmable logic, e.g., as field-programmable gate array (FPGA). Devices 100 and 400 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, the device comprises a storage circuit, an input interface circuit, a first encoded computation network circuit, a second encoded computation network circuit, and an elliptic curve arithmetic unit circuit. The device may also comprise a third encoded computation network circuit, a fourth encoded computation network circuit, a sixth encoded computation network circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

FIG. 5 schematically shows an example of an embodiment of a point multiplication method 500.

The electronic point multiplication method 500 is arranged to compute a point multiplication kG on an elliptic curve between a multiplier k and a base point G on the elliptic curve E for use in a cryptographic protocol. For example, method 500 may be implemented on an electronic device.

Method 500 comprises
storing 510 the base point G and multiple pre-computed auxiliary points $G_i$ on the elliptic curve,
receiving 520 a base hash h, 122 of an input message M,
deriving 530 the multiplier k and multiple derived hashes $h_i$ from the base hash h in the form of a first and second set of multiple joint encodings, the first set comprising the multiple derived hashes $A_i=\text{Enc}(k, h_i)$, $i=0\ldots 2n-1$, 221-223 each of which is jointly encoded with the multiplier k, the second set also comprising the multiple derived hashes each one of the derived hashes in the second set being jointly encoded $B_i=\text{Enc}(h_{2i}, h_{2i+1})$, $i=0\ldots n-1$, 321-323 with at least one other of the multiple derived hashes,
computing 540 from the first set of multiple joint encodings $A_i$ a blinded base multiplier A, 131,
compute 550 from the second set of multiple joint encodings $B_i$ multiple blinded auxiliary multipliers $\eta_i$, 136, the multiple blinded auxiliary multipliers corresponding to the multiple auxiliary points $G_i$,
performing 560 blinded elliptic curve arithmetic to obtain the point multiplication 141 kG of the multiplier k and the base point G by computing the point addition of:
the point multiplication of the blinded base multiplier and the base point on the elliptic curve, and
the multiple point multiplications of a blinded auxiliary multiplier and an auxiliary point.

FIG. 6 schematically shows an example of an embodiment of a ECDSA signature method. Method 600 comprises method 500 to compute the first component of the ECDSA signature. Method 600 further comprises computing a second component $s=(h+rx)k^{-1}$ of the signature by
deriving 610 the multiplier k and further multiple derived hashes $t_i$ from the base hash h in the form of a further first and second set of multiple joint encodings, the further first set comprising the multiple derived hashes $X_i=\text{Enc}(k, t_i)$, $i=0\ldots 2n-1$ each of which is jointly encoded with the multiplier k, the further second set comprising the multiple derived hashes $Y_i=\text{Enc}(h, t_i)$, $i=0\ldots 2n-1$ each of which is jointly encoded with the base hash h,
computing 620 from the further first set of multiple joint encodings $X_i$ a blinded multiplier $B=K'\cdot\Sigma_i D_i T_i$, 151 as a weighted average of the encoded multipliers in the further first set $K'=\Sigma_i \gamma_i k'_i$ times a weighted average of the encoded multipliers and derived hashes in the further first set $\Sigma_i D_i T_i$, $T_i=t_i+\Sigma_j \delta_{i,j} k'_j$
computing 630 from the further second set of multiple joint encodings $Y_i$ a blinded base hash H, 156 as a weighted average of the encoded base hashes in the further second set $H=\Sigma_i \mu_i h'_i$, and a de-blinding T', 157 value as a weighted average of the encoded base hashes and derived hashes $T'=\Sigma_i D_i T_i$, $T'_i=t_i+\Sigma_j v_{i,j} h_j$,
computing 640 the product of the inverse of the blinded multiplier $B^{-1}$, the de-blinding value T', and the sum xr+H of the product of the first component of the signature r times a private value x and the blinded base hash H in an encoded computation network of the device.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 540 and 550 may be executed, at least partially, in parallel. Moreover, a given step may not have finished completely before a next step is started.

A method according to the invention may be executed using software, which comprises instructions for causing a processor system to perform method 500 or 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

FIG. 7a shows a computer readable medium 1000 having a writable part 1010 comprising a computer program 1020, the computer program 1020 comprising instructions for causing a processor system to perform a point multiplication method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said a point multiplication method.

FIG. 7b shows in a schematic representation of a processor system 1140 according to an embodiment; for example, processor system 1140 may according to an embodiment of a point multiplication device or according to an embodiment of a ECDSA device. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the point multiplication device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A cryptographic computer device that is configured to perform cryptographic functions, the computer device comprising:
a processor circuit that executes at least one cryptographic function,
wherein the cryptographic function requires computing a point multiplication (kGkG) on an elliptic curve between a multiplier (kk) and a base point (GG) on the elliptic curve (EE);
a storage circuit,
wherein the storage circuit stores the base point (GG) and multiple pre-computed auxiliary points ($G_i G_i$) on the elliptic curve,
an interface circuit,
wherein the interface circuit is arranged to receive an input message (MM),
wherein the interface circuit is arranged to receive or compute a base hash (hh) of the input message (MM),
wherein the interface circuit is arranged to provide, as output, the point multiplication (kGkG) of the multiplier (kk) and the base point (GG),
wherein the processor circuit computes the point multiplication (kGkG) of the multiplier (kk) and the base point (GG) by:
deriving the multiplier (kk) and multiple derived hashes ($h_i h_i$) from the base hash (hh) in the form of a first and second set of multiple joint encodings, the first set comprising the multiple derived hashes ($A_i$=Enc (k, $h_i$), i=0 ... 2n-1 $A_i$=Enc(k, $h_i$), i=0 ... 2n-1) each of which is jointly encoded with the multiplier (kk), the second set also comprising the multiple derived hashes each one of the derived hashes in the second set being jointly encoded ($B_i$=Enc($h_{2i}$, $h_{2i+1}$), i=0 ... n-1 $B_i$=Enc($h_{2i}$, $h_{2i+1}$), i=0 ... n-1) with at least one other of the multiple derived hashes, computing from the first set of multiple joint encodings ($A_iA_i$) a blinded base multiplier (AA), computing from the second set of multiple joint encodings ($B_iB_i$) multiple blinded auxiliary multipliers ($\eta_i$ $\eta_i$), the multiple blinded auxiliary multipliers corresponding to the multiple auxiliary points ($G_iG_i$), performing blinded elliptic curve arithmetic to obtain the point multiplication (kGkG) by computing the point addition of:
 the point multiplication of the blinded base multiplier and the base point on the elliptic curve, and
 the multiple point multiplications of a blinded auxiliary multiplier of the multiple blinded auxiliary multipliers and an auxiliary point of the multiple auxiliary points, wherein the blinded base multiplier (AA) is a weighted sum of the encoded multipliers and derived hashes in the first set of multiple joint encodings, and wherein the multiple blinded auxiliary multipliers ($\eta_i$ $\eta_i$) are selected to correct for the derived hashes in the weighted sum.

2. The cryptographic computer device of 1, wherein the blinded base multiplier and the multiple blinded auxiliary multipliers are represented in a plain format during the performing of the blinded elliptic curve arithmetic.

3. The cryptographic computer device of 1,
 wherein the processor circuit comprises a first encoded computation network,
 wherein the first encoded computation network applies a first set of jointly encoded function pairs (($f$, $g_i$)($f$, $g_i$)) to a joint encoding of the base hash with itself (Enc(h, hEnc(h,h)),
 wherein each jointly encoded function pair comprises a joint encoding of a de-randomization function ($ff$) and a hash diversification function ($g_ig_i$),
 wherein the de-randomization function ($ff$) is arranged to derive the multiplier (kk) from the base hash (hh), and
 wherein the hash diversification function ($g_ig_i$) is a member of a set of hash diversification functions ($g_ig_i$, 0≤i≤2n-10≤i≤2n-1).

4. The cryptographic computer device of 3,
 wherein the processor circuit comprises a second encoded computation network,
 wherein the second encoded computation network applies a second set of jointly encoded second function pairs (($g_{2i}$, $g_{2i+1}$)($g_{2i}$, $g_{2i+1}$)) to a joint encoding of the base hash with itself (Enc(h,hEnc(h,h)),
 wherein each jointly encoded second function pair comprises a joint encoding of at least two hash diversification functions ($g_ig_i$) of the set of hash diversification functions ($g_ig_i$, 0≤i≤2n-10≤i≤2n-1).

5. The cryptographic computer device of 3, wherein at least one of the de-randomization function and the hash diversification functions are constructed according to a Substitution-Linear Transformation (SLT) construction.

6. The cryptographic computer device of 1, wherein at least one of the first set of multiple joint encodings and the second set of multiple joint encodings comprise byte-wise or nibble-wise joint encodings.

7. The cryptographic computer device of 1, wherein at least one of the first encoded computation network and the second encoded computation network set is configured for encoded Montgomery digit-based arithmetic.

8. The cryptographic computer device of 1, wherein the multiple pre-computed auxiliary points ($G_iG_i$) have been obtained as a point multiplication between a pre-computed multiplier and the base point ($G_{2i}$=−($a_id_i$−$b_ic_i$)$^{-1}$($d_iC_{2i}$−$c_iC_{2i+1}$)GG$_{2i}$=−($a_id_i$−$b_ic_i$)$^{-1}$(−$b_iC_{2i}$+$a_iC_{2i+1}$)G, $G_{2i+1}$= −($a_id_i$−$b_ic_i$)$^{-1}$($d_iC_{2i}$−$c_iC_{2i+1}$)GG$_{2i+1}$=−($a_id_i$−$b_ic_i$)$^{-1}$(−$b_iC_{2i}$+ $a_iC_{2i+1}$)G).

9. The cryptographic computer device of 1 further configured for computing an Elliptic Curve Digital Signature Algorithm (ECDSA) signature over the input message, wherein the processor circuit is configured to obtain a first component (r=μ(([k]G)$_2$))r=μ(([k]G)$_1$))) of the signature from the point multiplication (kGkG) on the elliptic curve between the multiplier (kk) and the base point (GG).

10. The cryptographic computer device of 9, wherein the processor circuit is arranged to compute a second component (s=(h+rx)k$^{-1}$s=(h+rx)k$^{-1}$) of the signature by:
 deriving the multiplier (kk) and further multiple derived hashes ($t_it_i$) from the base hash (hh) in the form of a further first and second set of multiple joint encodings,
  wherein the further first set comprises the multiple derived hashes ($X_i$=Enc(k, $t_i$), i=0 ... 2n-1$X_i$=Enc(k, $t_i$), i=0 ... 2n-1),
  wherein each of the multiple derived hashes is jointly encoded with the multiplier (kk),
  wherein the further second set comprises the multiple derived hashes ($Y_i$=Enc(h, $t_i$), i=0 ... 2n-1$Y_i$=Enc(h, $t_i$), i=0 ... 2n-1) each of which is jointly encoded with the base hash (hh),
 computing a blinded multiplier (B=K'·$\Sigma_iD_iT_i$B=K'·$\Sigma_iD_iT_i$)) from the further first set of multiple joint encodings ($X_iX_i$),
  wherein the blinded multiplier (B=K'·$\Sigma_iD_iT_i$B=K'·$\Sigma_iD_iT_i$)) comprises a weighted average of the encoded multipliers in the further first set (K'=$\Sigma_i\gamma_ik'_i$K'=$\Sigma_i\gamma_ik'_i$) times a weighted average of the encoded multipliers and derived hashes in the further first set ($\Sigma_iD_iT_i\Sigma_iD_iT_i$, $T_i$=$t_i$+$\Sigma_j\delta_{i,j}k'_j$ $T_i$=$t_i$+ $\Sigma_j\delta_{i,j}k'_j$)
 computing a blinded base hash (HH) from the further second set of multiple joint encodings ($Y_iY_i$),
  wherein the blinded base hash (HH) comprises a weighted average of the encoded base hashes in the further second set (H=$\Sigma_i\mu_ih'_i$H=$\Sigma_i\mu_ih'_i$), and de-blinding (TT') value,
  wherein the de-blinding (TT') value comprises a weighted average of the encoded base hashes and derived hashes (T=$\Sigma_iD_iT'_i$, $T'_i$=$t_i$+$\Sigma_jv_{i,j}h_j$T=$\Sigma_iD_iT'_i$, $T'_i$=$t_i$+$\Sigma_jv_{i,j}h_j$),
 computing a product of the inverse of the blinded multiplier (B$^{-1}$B$^{-1}$), the de-blinding value (TT'), and the sum (xr+H)(xr+H) of the product of the first component of the signature (rr) times a private value (xx) and the blinded base hash (HH) in an encoded computation network of the device.

11. A method of improving the security of cryptographic computer device that is configured to perform cryptographic functions, wherein at least one cryptographic function requires computing a point multiplication (kGkG) on an elliptic curve between a multiplier (kk) and a base point (GG) on the elliptic curve (EE), the method comprising:
 storing the base point (GG) and multiple pre-computed auxiliary points ($G_iG_i$) on the elliptic curve, receiving a base hash (hh) of the input message (MM),
deriving the multiplier (kk) and multiple derived hashes ($h_i h_i$) from the base hash (hh) in the form of a first and second set of multiple joint encodings,
  wherein the first set comprising the multiple derived hashes ($A_i$=Enc(k, $h_i$), i=0 . . . 2n−1$A_i$=Enc(k, $h_i$), i=0 . . . 2n−1),
  wherein each of the multiple derived hashes is jointly encoded with the multiplier (kk),
  wherein the second set comprises the multiple derived hashes,
  wherein each of the derived hashes in the second set is jointly encoded ($B_i$=Enc($h_{2i}$, $h_{2i+1}$), i=0 . . . n−1$B_i$=Enc($h_{2i}$, $h_{2i+1}$), i=0 . . . n−1) with at least one other of the multiple derived hashes,
computing a blinded base multiplier (AA) from the first set of multiple joint encodings ($A_i A_i$),
computing multiple blinded auxiliary multipliers ($\eta_i \eta_i$) from the second set of multiple joint encodings ($B_i B_i$),
  wherein the multiple blinded auxiliary multipliers correspond to the multiple auxiliary points ($G_i G_i$),
performing blinded elliptic curve arithmetic to obtain the point multiplication (kGkG) of the multiplier (kk) and the base point (GG) by computing the point addition of:
  the point multiplication of the blinded base multiplier and the base point on the elliptic curve, and
  the multiple point multiplications of a blinded auxiliary multiplier of the multiple blinded auxiliary multipliers and an auxiliary point of the multiple auxiliary points,
  wherein the blinded base multiplier (AA) is a weighted sum of the encoded multipliers and derived hashes in the first set of multiple joint encodings, and
  wherein the multiple blinded auxiliary multipliers ($\eta_i \eta_i$) are selected to correct for the derived hashes in the weighted sum.

12. The method of claim 11, comprising computing an Elliptic Curve Digital Signature Algorithm (ECDSA) signature over the input message,
  wherein the method comprises obtaining a first component (r=$\mu$(([k]G)$_2$))r=$\mu$(([k]G)$_1$))) of the signature from the point multiplication (kGkG) on the elliptic curve between the multiplier (kk) and the base point (GG).

13. The method of claim 12, further comprising computing a second component (s=(h+rx)$k^{-1}$ s=(h+rx)$k^{-1}$)) of the signature by:
  deriving the multiplier (kk) and further multiple derived hashes ($t_i t_i$) from the base hash (hh) in the form of a further first and second set of multiple joint encodings,
    wherein the further first set comprises the multiple derived hashes ($X_i$=Enc(k, $t_i$), i=0 . . . 2n−1$X_i$=Enc(k, $t_i$), i=0 . . . 2n−1),
    wherein each of the multiple derived hashes ($X_i$=Enc(k, $t_i$), i=0 . . . 2n−1$X_i$=Enc(k, $t_i$), i=0 . . . 2n−1) is jointly encoded with the multiplier (kk),
    wherein the further second set comprises the multiple derived hashes ($Y_i$=Enc(h, $t_i$), i=0 . . . 2n−1$Y_i$=Enc(h, $t_i$), i=0 . . . 2n−1),
    wherein each of which the multiple derived hashes ($Y_i$=Enc(h, $t_i$), i=0 . . . 2n−1$Y_i$=Enc(h, $t_i$), i=0 . . . 2n−1) is jointly encoded with the base hash (hh),
  computing a blinded multiplier (B=K'·$\Sigma_i D_i T_i$B=K'·$\Sigma_i D_i T_i$) from the further first set of multiple joint encodings ($X_i X_i$),
    wherein the blinded multiplier (B=K'·$\Sigma_i D_i T_i$B=K'·$\Sigma_i D_i T_i$) comprises a weighted average of the encoded multipliers in the further first set (K'=$\Sigma_i \gamma_i k'_i$K'=$\Sigma_i \gamma_i k'_i$) times a weighted average of the encoded multipliers and derived hashes in the further first set ($\Sigma_i D_i T_i \Sigma_i D_i T_i$, $T_i$=$t_i$+$\Sigma_j \delta_{i,j} k'_j$ $T_i$=$t_i$+$\Sigma_j \delta_{i,j} k'_j$),
  computing a blinded base hash (HH) from the further second set of multiple joint encodings ($Y_i Y_i$),
    wherein the blinded base hash (HH) comprises a weighted average of the encoded base hashes in the further second set (H=$\Sigma_i \mu_i h'_i$H=$\Sigma_i \mu_i h'_i$), and a de-blinding (T'T') value as a weighted average of the encoded base hashes and derived hashes (T'=$\Sigma_i D_i T'_i$, $T'_i$=$t_i$+$\Sigma_j v_{i,j} h_j$T'=$\Sigma_i D_i T'_i$, $T'_i$=$t_i$+$\Sigma_j v_{i,j} h_j$),
  computing the product of the inverse of the blinded multiplier ($B^{-1}B^{-1}$), the de-blinding value (T'T'), and the sum (xr+H)(xr+H) of the product of the first component of the signature (rr) times a private value (xx) and the blinded base hash (HH) in an encoded computation network of the device.

14. A non-transitory computer-readable medium having program code that, when executed by a processing device, causes the processing device to perform cryptographic functions, wherein at least one cryptographic function requires computing a point multiplication (kGkG) on an elliptic curve between a multiplier (kk) and a base point (GG) on the elliptic curve (EE), the program code causing the processing device to:
  store the base point (GG) and multiple pre-computed auxiliary points ($G_i G_i$) on the elliptic curve,
  receive a base hash (hh) of the input message (MM),
  derive the multiplier (kk) and multiple derived hashes ($h_i h_i$) from the base hash (h h) in the form of a first and second set of multiple joint encodings,
    wherein the first set comprises the multiple derived hashes ($A_i$=Enc(k, $h_i$), i=0 . . . 2n−1$A_i$=Enc(k, $h_i$), i=0 . . . 2n−1),
    wherein each of the multiple derived hashes is jointly encoded with the multiplier (kk),
    wherein the second set comprises the multiple derived hashes,
    wherein each of the derived hashes in the second set is jointly encoded ($B_i$=Enc($h_{2i}$, $h_{2i+1}$), i=0 . . . n−1$B_i$=Enc($h_{2i}$, $h_{2i+1}$), i=0 . . . n−1) with at least one other of the multiple derived hashes,
  compute a blinded base multiplier (AA) from the first set of multiple joint encodings ($A_i A_i$),
  compute multiple blinded auxiliary multipliers ($\eta_i \eta_i$) from the second set of multiple joint encodings ($B_i B_i$),
    wherein the multiple blinded auxiliary multipliers correspond to the multiple auxiliary points ($G_i G_i$),
  perform blinded elliptic curve arithmetic to obtain the point multiplication (kgkg) of the multiplier (kk) and the base point (GG) by computing the point addition of:
    the point multiplication of the blinded base multiplier and the base point on the elliptic curve, and
    the multiple point multiplications of a blinded auxiliary multiplier of the multiple blinded auxiliary multipliers and an auxiliary point of the multiple auxiliary points,
  wherein the blinded base multiplier (AA) is a weighted sum of the encoded multipliers and derived hashes in the first set of multiple joint encodings, and
  wherein the multiple blinded auxiliary multipliers ($\eta_i \eta_i$) are selected to correct for the derived hashes in the weighted sum.

15. The medium of claim 14, wherein the program code causes the processing device to compute an Elliptic Curve Digital Signature Algorithm (ECDSA) signature over the input message by obtaining a first component ($r=\mu(([k]G)_1)$) of the signature from the point multiplication ($kG$) on the elliptic curve between the multiplier ($k$) and the base point ($G$).

16. The medium of claim 15, wherein the program code causes the processing device to compute a second component ($s=(h+rx)k^{-1}$) of the signature by:

deriving the multiplier ($k$) and further multiple derived hashes ($t_i$) from the base hash ($h$) in the form of a further first and second set of multiple joint encodings, wherein the further first set comprises the multiple derived hashes ($X_i=\text{Enc}(k, t_i)$, $i=0\ldots 2n-1$), wherein each of the multiple derived hashes ($X_i=\text{Enc}(k, t_i)$, $i=0\ldots 2n-1$) is jointly encoded with the multiplier ($k$), wherein the further second set comprises the multiple derived hashes ($Y_i=\text{Enc}(h, t_i)$, $i=0\ldots 2n-1$), wherein each of the multiple derived hashes ($Y_i=\text{Enc}(h, t_i)$, $i=0\ldots 2n-1$) is jointly encoded with the base hash ($h$), computing a blinded multiplier ($B=K'\cdot\Sigma_i D_i T_i$) from the further first set of multiple joint encodings ($X_i$), wherein the blinded multiplier ($B=K'\cdot\Sigma_i D_i T_i$) comprises a weighted average of the encoded multipliers in the further first set ($K'=\Sigma_i \gamma_i k'_i$) times a weighted average of the encoded multipliers and derived hashes in the further first set ($\Sigma_i D_i T_i$, $T_i=t_i+\Sigma_j \delta_{i,j} k'_j$), computing a blinded base hash ($H$) from the further second set of multiple joint encodings ($Y_i$), wherein the blinded base hash ($H$) comprises a weighted average of the encoded base hashes in the further second set ($H=\Sigma_i \mu_i h'_i$) and a de-blinding ($T'$) value as a weighted average of the encoded base hashes and derived hashes ($T'=\Sigma_i D_i T'_i$, $T'_i=t_i+\Sigma_j v_{i,j} h_j$), computing the product of the inverse of the blinded multiplier ($B^{-1}$), the de-blinding value ($T'$), and the sum ($xr+H$) of the product of the first component of the signature ($r$) times a private value ($x$) and the blinded base hash ($H$) in an encoded computation network of the device.

* * * * *